United States Patent [19]

Kozakae

[11] 4,443,208

[45] Apr. 17, 1984

[54] SPEED-CHANGE GEAR MOUNTED OUTSIDE A BICYCLE

[75] Inventor: Kunitoshi Kozakae, Ageo, Japan

[73] Assignee: Bridgestone Cycle Co. Ltd., Japan

[21] Appl. No.: 217,107

[22] Filed: Dec. 16, 1980

[51] Int. Cl.³ .............................................. F16H 11/08
[52] U.S. Cl. ....................................... 474/82; 474/80
[58] Field of Search ......................................... 474/82

[56] References Cited

U.S. PATENT DOCUMENTS

| | | | |
|---|---|---|---|
| 3,973,447 | 8/1976 | Nagano | 474/82 |
| 3,979,962 | 9/1976 | Kebsch | 474/82 |
| 4,161,124 | 7/1979 | Juy | 474/82 |
| 4,185,510 | 1/1980 | Juy | 474/82 |
| 4,273,546 | 6/1981 | Bergles | 474/82 |
| 4,343,613 | 8/1982 | Leiter et al. | 474/82 |

FOREIGN PATENT DOCUMENTS 52-15033 2/1977 Japan .

*Primary Examiner*—Lawrence J. Staab
*Assistant Examiner*—Joseph M. Rolnicki
*Attorney, Agent, or Firm*—Parkhurst & Oliff

[57] ABSTRACT

The disclosed speed-change gear includes a fitting secured to the frame of a bicycle, a parallel link means having an outside link and an inside link whose one ends are pivotally connected to the fitting, a movable member pivotally connected to the opposite ends of the inside and outside links, a changeover frame rotatably secured to the movable member, which changeover frame carries a guide wheel and a tension wheel of a chain, and a cam means adapted to selectively move said movable member so as to shift the speed-change ratio by changing the position of said changeover frame to shift the chain to the desired step of a multi-step sprocket assembly of the bicycle. The cam means has a spring-biased cam rotatably mounted on a shaft connecting the outside link to the fitting, which cam rotates together with a wire-operated reel coaxially mounted on said shaft. The rotation of the cam actuates said parallel link means through a lever pivotally carried by a shaft connecting the inside link to the fitting.

4 Claims, 9 Drawing Figures

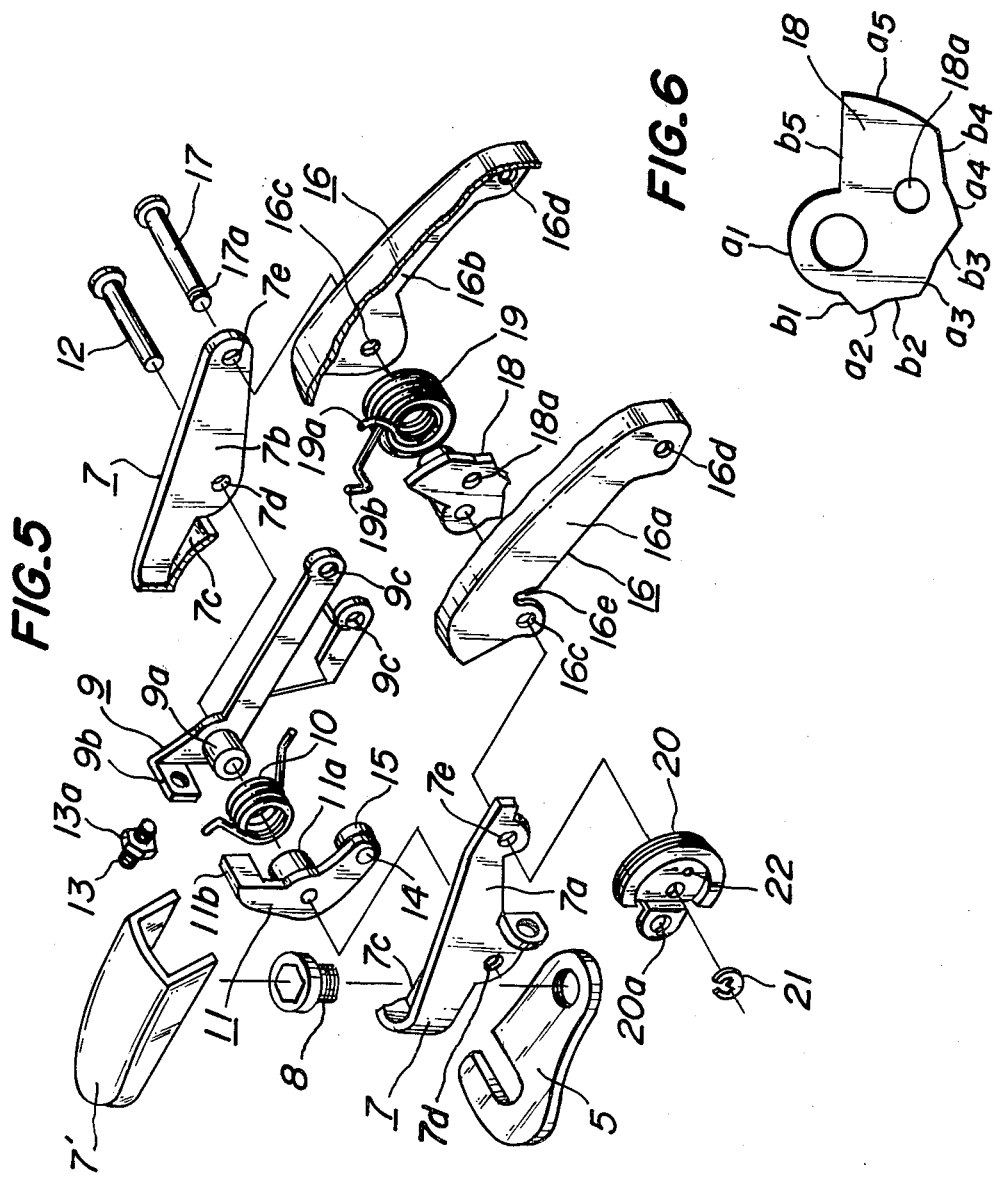

SPEED-CHANGE GEAR MOUNTED OUTSIDE A BICYCLE

BACKGROUND OF THE INVENTION

1. Field of the Invention

This invention relates to a speed-change gear to be mounted outside a bicycle having a multi-step sprocket assembly, which speed-change gear shifts a bicycle-driving chain among different steps of the sprocket assembly.

2. Description of the Prior Art

The inventors have disclosed a speed-change gear to be mounted outside a bicycle in Japanese Patent Application No. 90,492/75, which was laid open as Japanese Patent Laying-open Specification No. 15,033/77. The disclosed speed-change gear has shortcomings in that, in addition to shafts holding a parallel link means, a separate shaft is secured to a fitting member so as to rotatably hold a speed-change actuating cam, a reel connected to an operating wire means, and a spring, so that the speed-change gear is complicated in construction and comparatively heavy, and that the disclosed speed-change gear has an adjusting bolt and the like projecting to the outside of the bicycle so that the projecting bolt and the like may come in contact with a person and hurt him.

SUMMARY OF THE INVENTION

Therefore, an object of the invention is to obviate the aforesaid shortcomings of the prior art. The present invention simplified the construction of a speed-change gear to be mounted outside a bicycle and reduces the weight thereof, by mounting a speed-change actuating cam, a reel connected to an operating wire means, and spring means on shafts pivotally supporting a parallel link means.

Another object of the present invention is to improve the safety of a bicycle with a speed-change gear mounted outside thereof, by enclosing conventionally exposed members, such as a speed-change actuating cam, springs, an adjusting bolt, a movable member and the like, with a cover and an outside link, so as to eliminate projections extending to the outside of the bicycle.

BRIEF DESCRIPTION OF THE DRAWINGS

FIG. 5 is an exploded perspective view of essential portions of the speed-change gear according to the present invention;

FIG. 6 is a diagram showing the contour of a speed-change actuating cam which is used in the speed-change gear of the invention.

Throughout the different views of the drawings, 1 is a bicycle frame; 2 is a rear axle; 3 is a multi-step sprocket assembly; 4 is a chain; 5 is a mounting plate; 6 is a nut; 7 is a metal fitting; 7' is a cover; 8 is a bolt; 9 is an inside link; 10, 19, 28, and 35 are coiled springs; 11 is an L-shaped lever; 12 is an inside link connecting shaft; 13 is an adjusting bolt; 14, 26, and 27 are pins; 15 is a cam roller; 16 is an outside link; 17 is an outside link connecting shaft; 18 is a speed-change actuating cam; 20 is a reel; 21 is a stop ring; 22 is a knock pin; 23 is a wire adjuster; 24 is a wire holding screw; 25 is a movable member; 29 is a guide wheel; 30 and 32 are shafts; 31 is a tension wheel; 33 is a changeover frame; 34 is a rod; 36 is a stop ring; and 37 is a stopper pin.

DESCRIPTION OF THE PREFERRED EMBODIMENT

Figure 1:
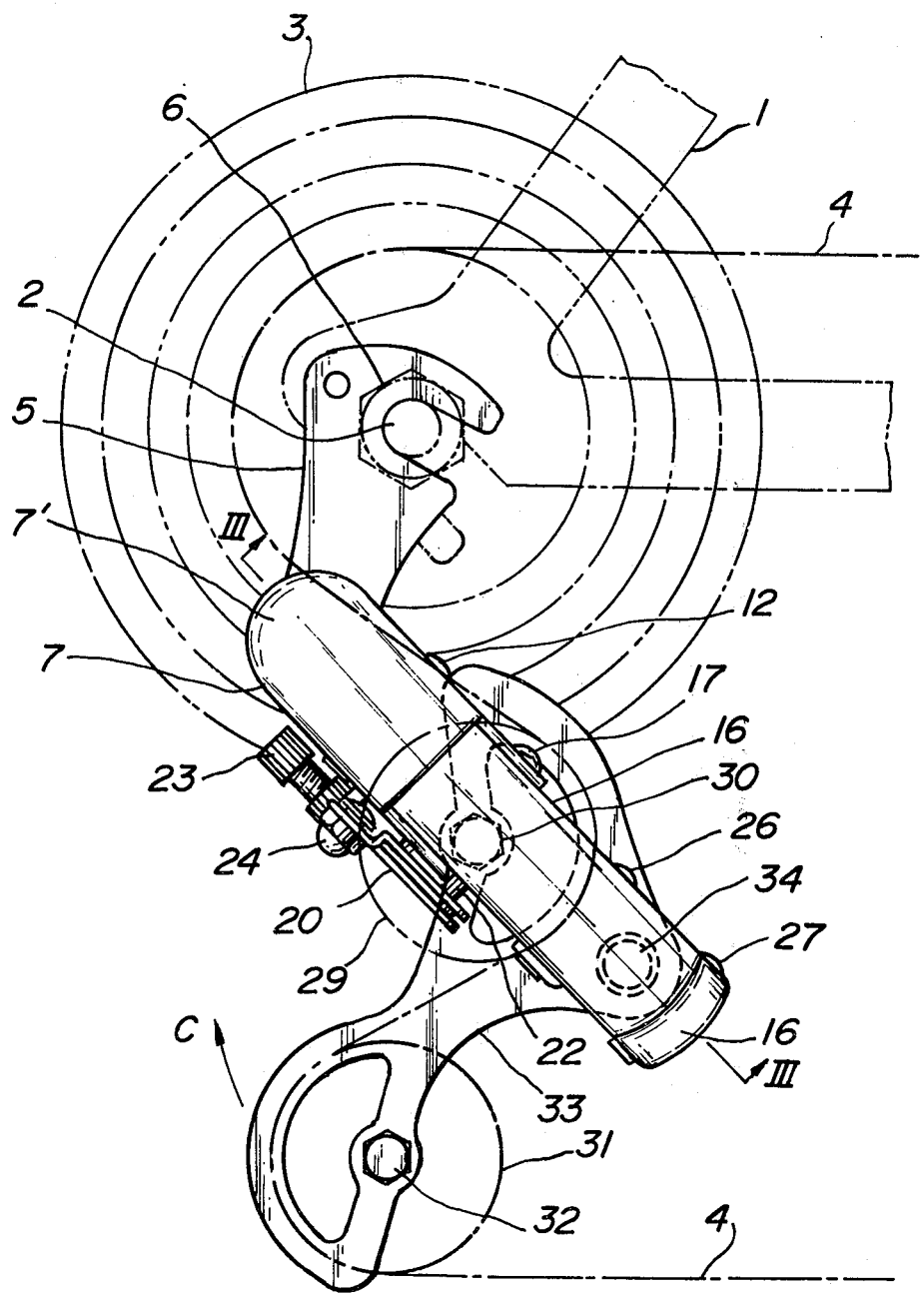
FIG. 1 is a schematic side view of a speed-change gear according to the present invention, shown in the state as mounted on a bicycle rear axle.

Referring to FIG. 1, a bicycle frame 1 holds a rear axle 2 having a multi-step sprocket assembly 3 mounted thereon, which multi-step sprocket assembly 3 includes different step sprockets so that the bicycle-driving chain 4 can selectively engage one of the different step sprockets. A mounting plate 5 is secured to the rear axle 2 by a nut 6 meshing a tapped end portion of the rear axle 2.

Figure 3:
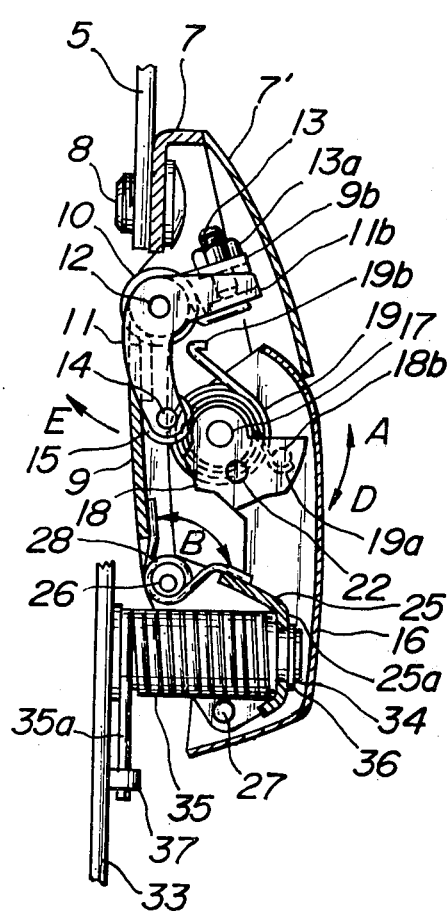
FIG. 3 is a schematic sectional view taken roughly along the line III—III of FIG. 1, showing the inside mechanism thereof.
Figure 4:
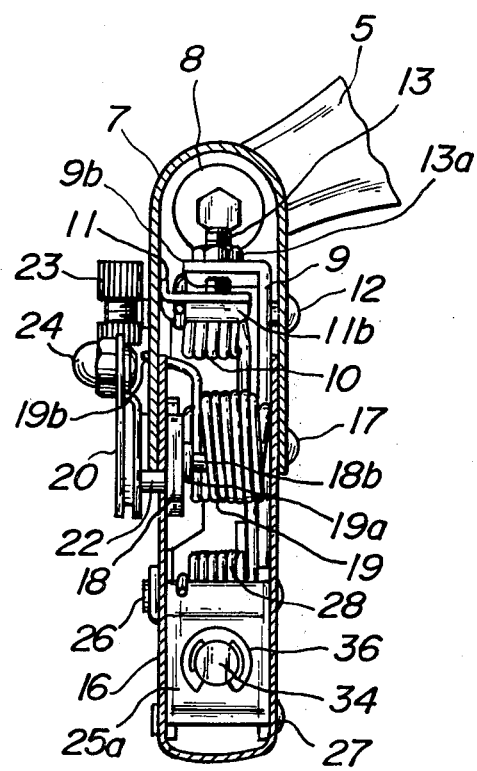
FIG. 4 is a schematic sectional view taken roughly along the line IV—IV of FIG. 2, with a cover thereof removed to show the inside mechanism thereof.

In the illustrated embodiment, a metal fitting 7 is secured to the mounting plate 5 by a bolt 8 as shown in FIGS. 3 and 4. The metal fitting 7 is formed by bending a metal plate into U-shape with opposite sidewalls 7a, 7b and a connecting portion 7c extending between the sidewall portions, which connecting portion 7c is used as a seat to secure the fitting 7 onto the mounting plate 5. The sidewalls 7a and 7b have four shaft holes; namely, two aligned shaft holes 7d for an inside link connecting shaft 12 and two aligned shaft holes 7e for an outside link connecting shaft 17. The inside link connecting shaft 12 extends through the two shaft holes 7d of the opposing sidewalls 7a and 7b, so as to pivotally support the boss 9a of an inside link 9, a coiled spring 10, and the boss 11a of an L-shaped lever 11 disposed between the sidewalls of the metal fitting 7. The inside link 9 has a bent piece 9b formed at the upper end thereof, and an adjusting bolt 13 engages a threaded hole of the bent piece 9b. A lock nut 13a holds the position of the adjusting bolt 13 relative to the bent piece 9b of the inside link 9. The lower end of the inside link 9 has a channel-shaped portion, and two aligned holes 9c are bored through sidewalls of the channel-shaped portion so as to pivotally support one side of a movable member 25 between the sidewalls by a pin 26 fitted in the holes 9c, which movable member 25 will be described hereinafter. The L-shaped lever 11 has a bent piece 11b formed at one end thereof so as to allow the aforesaid adjusting bolt 13 to strike and engage the bent piece 11b. The opposite end of the L-shaped lever 11 carries a cam roller 15 rotatably secured thereto by a pin 14. The coiled spring 10 urges the inside link 9 in a clockwise direction while urging the L-shaped lever 11 in a counterclockwise direction, as seen in FIG. 3. A cover 7' is detachably mounted on the metal fitting 7 so as to cover the outer open side of the metal fitting 7.

An outside link 16 of curved channel shape coacts with the inside link 9 in forming a parallel link means. The outside link 16 has sidewalls 16a and 16b, two aligned shaft holes 16c at upper end portions of the sidewalls so as to rotatably hold the outside link connecting shaft 17, two aligned holes 16d formed at the lower end portions of the sidewalls so as to hold a pin 27 supporting the movable member 25 at the side opposite to the side supported by the aforesaid pin 26, and a notch 16e. The aforesaid shaft 17 extends through the aligned holes 7e of the metal fitting 7 and the holes 16c of the outside link 16, and a speed-change actuating cam 18 and a coiled spring 19 are rotatably supported by the shaft 17 in a space between the sidewalls 16a, 16b of the outside link 16. One end of the shaft 17 projects to the outside of the metal fitting 7, and a reel 20 is secured to the projected portion of the shaft 17, as shown in FIGS. 4 and 5. Referring to FIG. 5, a stop ring 21 is fitted in an annular groove 17a formed at the projected end portion of the shaft 17, so as to prevent the reel 20 from dropping out of the shaft 17.

As shown in detail in FIG. 6, the speed-change actuating cam 18 has equi-level portions $a_1$, $a_2$, $a_3$, $a_4$, and $a_5$, the number of the equi-level portions being the same as the number of sprockets in the multi-step sprocket assembly 3. Transitional portions $b_1$, $b_2$, $b_3$, $b_4$, and $b_5$ extend between adjacent equi-level portions. The speed-change actuating cam 18 has a hole 18a, and one end of a knock pin 22 integral with the reel 20 fits in the hole 18a so as to integrally connect the cam 18 with the reel 20. One end 19a of the coiled spring 19 engages a pin 18b projecting from the speed-change actuating cam 18 as shown in FIGS. 3 and 4, while the opposite end 19b of the coiled spring 19 engages the metal fitting 7, whereby the speed-change actuating cam 18 is urged in the direction of the arrow A of FIG. 3. The notch 16e of the outside link 16 as shown in FIG. 5 acts as a stopper of the rotation of the knock pin 22.

Specifically referring to FIG. 1 and FIG. 4, a wire adjuster 23 of speed-change actuating wire means (not shown) is secured to the metal fitting 7, and an inner wire (not shown) thereof is wound around the reel 20 while one end thereof is secured to a wire holding screw 24 fitted in a hole 20a of the reel 20.

As shown in FIGS. 3, 4, 7 and 8, the upper end of the aforesaid box-shaped movable member 25 surrounded by the aforesaid outside link 16 is connected to the inside link 9 by the pin 26 extending through the holes 9c of the lower end of the inside link 9. The lower end of the movable member 25 is connected to the outside link 16 by the pin 27 extending through the holes 16d at the lower end of the outside link 16. A coiled spring 28 is fitted on the aforesaid pin 26 to apply a force in the direction of the arrow B of FIG. 3, so as to normally urge the movable member 25 in the clockwise direction relative to the inside link 9.

Figure 2:
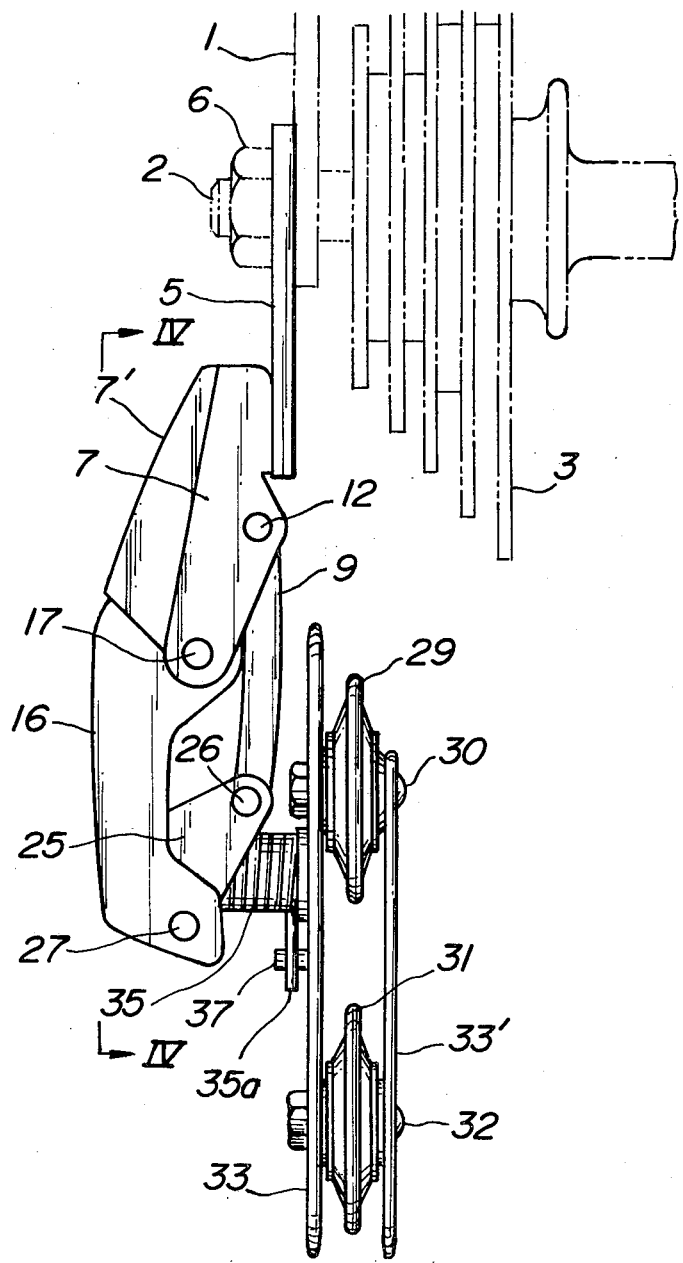
FIG. 2 is a schematic front view of the speed-change gear of FIG. 1.

Referring to FIGS. 1 and 2, a guide reel 29 of the chain 4 is pivotally supported by a changeover frame 33 through a shaft 30, while a tension wheel 31 of the chain 4 is pivotally supported by the changeover frame 33 through a shaft 32. One end of a rod 34 is secured to an intermediate portion of the changeover frame 33, and the opposite end of the rod 34 is rotatably supported by a vertical wall 25a of the movable member 25. A coiled spring 35 is fitted on the outside of the rod 34 between the changeover frame 33 and the vertical wall 25a of the movable member 25. A stop ring 36 engages that end of the rod 34 which extends to the outside of the box-shaped movable member 25, so as to prevent the rod 34 from being separated from the movable member 25. A counter plate 33' is secured to the changeover frame 33 with a spacing therefrom, so as to rotatably hold the wheels 29 and 31 between the changeover frame 33 and the counter plate 33'. The coiled spring 35 has one end thereof 35a extended and engaged with a stopper pin 37 secured to the changeover frame 33, so that the changeover frame 33 is urged in the direction of the arrow C around the rod 34, as seen in FIG. 1.

The operation of the speed-change gear of the aforesaid construction according to the present invention will be now described.

Figure 7:
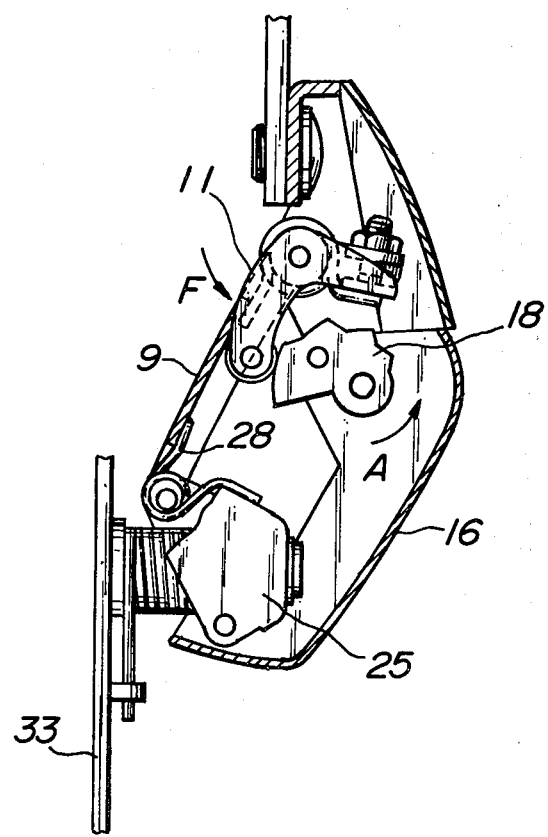
FIGS. 7 through 9 are sectional views similar to that of FIG. 3, showing different operative conditions of the speed-change gear of the invention.

When the movable member 25 is at its high-speed position as shown in FIG. 2 and a crank (not shown) is rotated to allow the movement of the changeover frame 33, if the inner wire of a transmission wire means (not shown) is pulled by an operating mechanism (not shown), the thus pulled inner wire (not shown) causes the reel 20 and the cam 18 to rotate by an angle in the direction of the arrow D of FIG. 3. As a result, the lever 11 engaging the cam 18 is turned in the direction of the arrow E of the figure. The lever 11 can turn in the direction of the arrow E relative to the inside link 9 against the elasticity of the coiled spring 10, while the coiled spring 10 is present so as to be compressed only by a force larger than that necessary for shifting the chain 4 among different steps of the multi-step sprocket assembly 3. Accordingly, as long as the movable member 25 is movable, the coiled spring 10 will never be compressed. Since the movable member 25 and the changeover frame 33 are now assumed to be movable, the inside link 9 turns together with the lever 11 from the position of FIG. 3 to that of FIG. 7. In this case, the spring 28 is compressed, and the outside link 16 turns together with the inside link 9 as shown in FIG. 7, so that the movable member 25 moves to the side of a low speed-change ratio position, and the chain 4 is shifted to that step of the multi-step sprocket assembly 3 which has a speed-change ratio lower than before by a number of differential steps caused by the aforesaid angle of rotation of the cam 18. FIG. 7 shows the conditions in which the chain 4 is shifted to the lowest speed-change ratio step of the multi-step sprocket assembly 3.

When the movable member 25 is at the low speed-change ratio position (see FIG. 7) and the crank (not shown) is rotated to allow the movement of the changeover frame 33, if the transmission wire means (not shown) is released by the operating mechanism (not shown), the reel 20 is turned by the coiled spring 19 to take up the inner wire (not shown) thereon. At the same time, the cam 18 rotates by an angle in the direction of the arrow A of FIG. 7. Such rotation of the cam 18 in the direction of the arrow A make the movable member 25 ready for movement, and the elasticity of the coiled spring 28 tends to turn the inside link 9 to its high speed-change ratio position, and the lever 11 is urged in the direction of the arrow F by the elasticity of the coiled spring 10. Thus, as the cam 18 rotates by the aforesaid angle in the direction of the arrow A, the lever 11 turns in the direction of the arrow F by an angle which corresponds to a number of differential steps caused by the aforesaid angle of rotation of the cam 18. Consequently, the inside link 9 and the outside link 16 simultaneously turn from the position of FIG. 7 toward the position of FIG. 3. As a result, the movable member 25 shifts to the position of a higher speed-change ratio, and the chain 4 is shifted to that step of the multi-step sprocket assembly 3 which has a speed-change ratio higher than before by a number of differential steps caused by the aforesaid angle of rotation of the cam 18.

On the other hand, if the crank (not shown) is at rest, the shift of the chain 4 between adjacent steps of the multi-step sprocket assembly 3 is not possible, so that the movable member 25 cannot move under such conditions.

Figure 8:
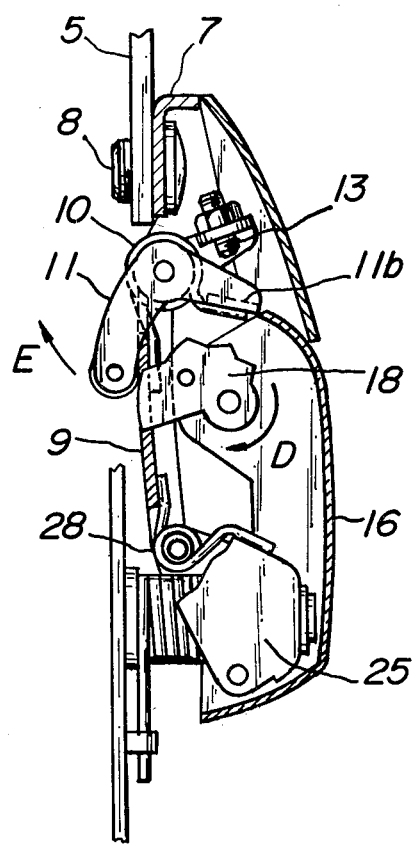
Figure 9:
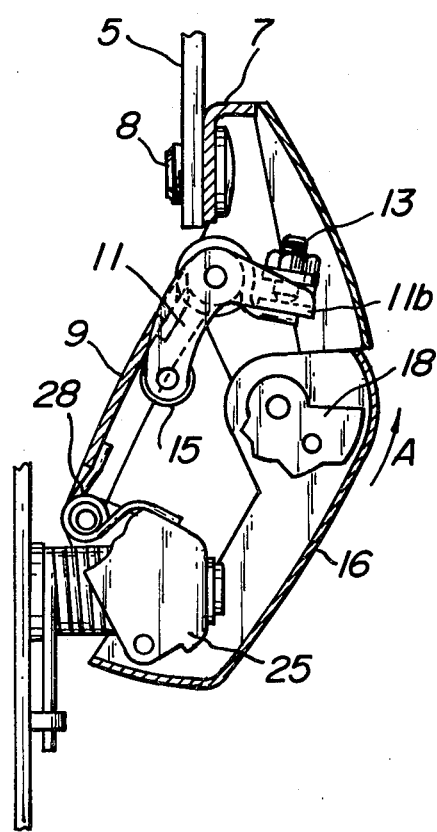

Thus, when the movable member 25 is at the high speed-change ratio position as shown in FIG. 3 and the crank (not shown) is at rest to inhibit movement of the movable member 25, if the inner wire of the transmission wire means (not shown) is pulled by the operating mechanism (not shown), the reel 20 and the cam 18 are simultaneously rotated by an angle in the direction of the arrow D of FIG. 8. Since the movable member 25 cannot move now, both the inside link 9 and the outside link 16 cannot turn. The lever 11, however, turns relative to the inside link 9 in the direction of the arrow E of the figure against the elasticity of the coiled spring 10, and the cam roller 15 of the lever 11 rides on that equi-level portion of the cam 18 which comes in contact with the cam roller 15 as the cam 18 rotates. Accordingly, the bent piece 11b of the lever 11 acting as the stopper leaves the adjusting bolt 13 and assumes a position spaced therefrom as shown in FIG. 8. Thus, a force to turn the inside link 9 and the outside link 16 to a lower speed-change ratio position is stored in the coiled spring 10. If the crank (not shown) is turned under the conditions of having the aforesaid force stored in the coiled spring 10, the movable member 25 is allowed to move, and the force stored in the coiled spring 10 overcomes the elasticity of the coiled spring 28 and forces the inside link 9 and the outside link 16 to turn until the adjusting bolt 13 strikes the bent piece 11b of the lever 11, as shown in FIG. 9. Consequently, the movable member 25 is shifted to a lower speed-change ratio position, and the chain 4 is shifted to that step of the multi-step sprocket assembly 3 which has a speed-change ratio lower than before by a number of differential steps corresponding to the aforesaid angle of rotation of the cam 18.

When the movable member 25 is at a low speed-change ratio position as shown in FIG. 7 and the crank (not shown) is at rest to inhibit the shift of the movable member 25, if the transmission wire means (not shown) is released by the operating mechanism (not shown), the reel 20 takes up the inner wire (not shown) thereof by the elasticity of the coiled spring 19 and the cam 18 turns by an angle in the direction of the arrow A of the figure. Since the movable member 25 cannot move now, both the inside link 9 and the outside link 16 cannot turn. On the other hand, the cam 18 rotates from the position of FIG. 7 to the position of FIG. 9 in the direction of the arrow A, and a spacing is produced between the cam 18 and the cam roller 15 at one end of the lever 11 as shown in FIG. 9, which spacing corresponds to a number of differential steps caused by the aforesaid angle of rotation of the cam 18. Under the conditions of having the aforesaid spacing between the cam roller 15 and the cam 18, if the crank (not shown) is turned to allow movement of the movable member 25, the elasticity of the coiled spring 28 normally urging the inside link 9 and the outside link 16 to a higher speed-change ratio position causes the inside link 9, the outside link 16, and the lever 11 to turn until the cam roller 15 carried at one end of the lever 11 strikes one of the equi-level portions of the cam 18. As a result, the movable member 25 moves to a higher speed-change ratio position as shown in FIG. 3, and the chain 4 is shifted to that step of the multi-step sprocket assembly 3 which has a speed-change ratio higher than before by the aforesaid number of differential steps caused by the aforesaid angle of rotation of the cam 18.

The effects obtained by the present invention will be described now. In speed-change gears of the aforesaid type according to the prior art, a shaft separate from the connecting shafts of a parallel link means is secured to a metal fitting to hold a speed-change actuating cam, a reel connected to an actuating wire means, and a spring means. Accordingly, the speed-change gear of the prior art is complicated in construction and comparatively heavy. Moreover, the speed-change gear of the prior art includes an adjusting bolt and the like which project to the outside of a bicycle equipped with the speed-change gear, and such projecting bolt and the like are dangerous because they may hit and hurt persons. On the other hand, the speed-change gear of the present invention uses the shaft 17 of the outside link 16 of the parallel link means to hold the speed-change actuating cam 18, the reel 20 connected to the operating wire means, and a coiled spring 19, so that the structure of the speed-change gear is simplified and the weight thereof is reduced. Furthermore, according to the present invention, the conventionally exposed speed-change actuating cam 18, the coiled spring 19, the adjusting bolt 13, and the movable member 25 are enclosed by the cover 7' of the metal fitting 7 and the outside link 16, so that projections to the outside of a bicycle are completely eliminated. As a result, the safety of the bicycle is improved, and the size of the speed-change gear to be mounted outside the bicycle is made smaller while the outlook of the speed-change gear is made more attractive than before.

Although the invention has been described with a certain degree of particularity, it is understood that the present disclosure has been made only by way of example and that numerous changes in details of construction and the combination and arrangement of parts may be resorted to without departing from the scope of the invention as hereinafter claimed.

What is claimed is:

1. A speed-change gear mounted outside a bicycle having a multi-step sprocket assembly engaging a chain, said speed-change gear comprising a fitting member secured to a frame of the bicycle; a parallel link means including an inside link with one end thereof rotatably connected to the fitting member by an inside link connecting shaft and an outside link with one end thereof rotatably connected to the fitting member by an outside link connecting shaft; a movable member connected to opposite ends of said inside link and said outside link; a changeover frame carrying a guide wheel and a tension wheel of the chain, said changeover frame being rotatably mounted on said movable member; a speed-change actuating cam and a spring biasing said cam rotationally in one direction, said cam and said biasing spring being carried directly by said outside link connecting shaft and capable of rotating with respect to said outside link about said outside link connecting shaft, said outside link having a portion thereof to cover said speed-change actuating cam, said biasing spring, and outside of said movable member; an L-shaped transmission lever pivotally carried by said inside link connecting shaft, and a lever-actuating spring, said lever having one end thereof urged against said speed-change actuating cam by said lever-actuating spring and the opposite end thereof selectively engageable with said inside link, said inside link having a portion thereof enclosing said L-shaped lever and said lever-actuating spring therein; a cover to enclose outer surfaces of said inside link and said outside link, said cover being connectable to said fitting member; and a circular shaped reel integrally secured to that portion of said outside link connecting shaft which extends outside said fitting member, said reel having an inner wire of an operating wire means connected thereto, and being connected to said speed-change actuating cam so as to rotate therewith, whereby said cam rotates in response to a pulling of said inner wire of an operating wire means.

2. A speed-change gear as set forth in claim 1, wherein said movable member being adapted to move laterally with said inside line in response to a change in angular position of said speed-change actuating cam through said inside link, so as to shift said change-over frame from one speed-change ratio position to another speed-change ratio position.

3. A speed-change gear as set forth in claim 2, wherein said change-over frame is adapted to shift the path of said chain depending on said angular position of said speed-change actuating cam, so as to change speed-change ratio by shifting said chain from one step to another step of said multi-step sprocket assembly.

4. A speed-change gear mounted outside a bicycle having a multi-step sprocket assembly engaging a chain, said speed-change gear including a fitting member secured to a frame of the bicycle; a parallel link means including an inside link with one end thereof rotatably connected to the fitting member by an inside link connecting shaft and an outside link with one end thereof rotatably connected to the fitting member by an outside link connecting shaft; a movable member connected to opposite ends of said inside link and said outside link; a changeover frame carrying a guide wheel and a tension wheel of the chain, said changeover frame being rotatably mounted on said movable member; a speed-change actuating cam having an inner wire of an operating wire means connected thereto; a spring biasing said cam in one rotating direction; an L-shaped transmission lever pivotally carried by said inside link connecting shaft; and a lever-actuating spring, said lever having one end thereof urged against said speed-change actuating cam by said lever-actuating spring and the opposite end thereof selectively engageable with said inside link, wherein the improvement comprises: said outside link having a portion thereof to enclose said speed-change actuating cam, said biasing spring, and said movable member; said cam being rigidly coaxially connected to a circular shaped reel through said outside connecting shaft; with said reel, said cam and said biasing spring being carried by said outside link connecting shaft; said outside link, and said cam being capable of moving rotationally with respect to each other about said outside link connecting shaft, said reel being arranged on outer side of said outside link; said inside link having a portion thereof enclosing said L-shaped transmission lever and said lever-actuating spring therein; and said fitting member having a cover portion in which said portion of said inside link is enclosed.

* * * * *